United States Patent
Bagade et al.

(10) Patent No.: US 10,860,394 B2
(45) Date of Patent: Dec. 8, 2020

(54) GENERATE AND PROVISION A CLOUD DEVICE APPLICATION USING A SOFTWARE SERVICE STORE

(71) Applicant: Rapyuta Robotics Co., Ltd, Tokyo (JP)

(72) Inventors: Vivek Bagade, Tokyo (JP); Dhananjay Sathe, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 229 days.

(21) Appl. No.: 16/034,995

(22) Filed: Jul. 13, 2018

(65) Prior Publication Data

US 2019/0089602 A1    Mar. 21, 2019

Related U.S. Application Data

(60) Provisional application No. 62/559,938, filed on Sep. 18, 2017.

(51) Int. Cl.
| | |
|---|---|
| *G06F 15/16* | (2006.01) |
| *G06F 9/54* | (2006.01) |
| *H04L 29/08* | (2006.01) |
| *G06F 11/30* | (2006.01) |
| *G06F 11/34* | (2006.01) |
| *H04L 12/28* | (2006.01) |
| *H04L 12/24* | (2006.01) |

(52) U.S. Cl.
CPC ............. *G06F 9/542* (2013.01); *G06F 9/546* (2013.01); *G06F 11/3006* (2013.01); *G06F 11/3476* (2013.01); *H04L 12/2854* (2013.01); *H04L 67/10* (2013.01); *H04L 67/12* (2013.01); *H04L 67/125* (2013.01); *H04L 67/2809* (2013.01); *H04L 41/0853* (2013.01)

(58) Field of Classification Search
CPC ....................................................... H04L 67/10
USPC ........................................................ 709/226
See application file for complete search history.

(56) References Cited

U.S. PATENT DOCUMENTS

| | | | |
|---|---|---|---|
| 9,008,839 B1* | 4/2015 | Kuffner, Jr. ............ | B25J 9/1679 700/248 |
| 9,602,344 B1* | 3/2017 | Iyengar ..................... | G06F 8/76 |
| 9,606,794 B1* | 3/2017 | Chou .................. | G06F 3/04842 |
| 2013/0124807 A1* | 5/2013 | Nielsen ............... | G06F 11/1438 711/162 |
| 2013/0191539 A1* | 7/2013 | Sailer ...................... | H04L 67/10 709/225 |
| 2013/0232480 A1* | 9/2013 | Winterfeldt ............... | G06F 8/60 717/177 |

(Continued)

*Primary Examiner* — Hamza N Algibhah
(74) *Attorney, Agent, or Firm* — Trupti P. Joshi (57) ABSTRACT

A system and method to generate and deploy a cloud device application has been described. Initially a software service is selected from a software service store to generate the cloud device application. A selection of composition pattern is then received for generating a cloud device application including the software service. Based on the composition pattern an instance of the software service is generated and deployed at cloud and one or more devices. Next an instance of the application is generated and bound to the deployed instance of the software service. Finally the instance of the application bound to the deployed instance of the software service is deployed to the cloud and the one or more devices.

20 Claims, 7 Drawing Sheets

(56) References Cited

U.S. PATENT DOCUMENTS

| | | |
|---|---|---|
| 2013/0346945 A1* | 12/2013 | Yousouf .................... G06F 8/60 717/121 |
| 2014/0325503 A1* | 10/2014 | Li ....................... G06F 11/3433 717/177 |
| 2015/0268935 A1* | 9/2015 | Muntes .................... G06F 8/70 717/105 |
| 2016/0019636 A1* | 1/2016 | Adapalli ................ H04L 47/70 705/26.62 |
| 2016/0034267 A1* | 2/2016 | Wetzold ................. H04L 67/10 717/172 |
| 2016/0094483 A1* | 3/2016 | Johnston ............... H04L 47/827 709/226 |
| 2017/0003960 A1* | 1/2017 | Subramanian ............ G06F 8/76 |
| 2017/0279692 A1* | 9/2017 | Llagostera ................ G06F 8/60 |
| 2017/0300497 A1* | 10/2017 | Pan ........................ G06F 16/00 |
| 2018/0101371 A1* | 4/2018 | Flanakin .................... G06F 8/60 |
| 2018/0191865 A1* | 7/2018 | De Gaetano ........ G06F 11/2025 |
| 2018/0241642 A1* | 8/2018 | Patel ................... H04L 41/5048 |

* cited by examiner

FIG. 1

ADD NEW SERVICE 202

NAME
204

VERSION
206

DESCRIPTION
208

RUNTIME
210

SOFTWARE SERVICE SELECTION SECTION 212

NAME
214

SERVICE ID
216

PARAMETERS
218

EXPOSED PARAMETERS 220

PARAMETER NAME
222

EXPOSED NAME
224

GENERATE AND PROVISION A CLOUD DEVICE APPLICATION USING A SOFTWARE SERVICE STORE

This application claims priority under 35 U.S.C. § 119(e) to provisional application No. 62/559,938 filed on Sep. 18, 2017, the contents of which are hereby incorporated by reference in their entirety.

TECHNICAL FIELD

The present invention relates generally to a software service store and more particularly to generating and provisioning a cloud device application using a software service store.

BACKGROUND

Cloud computing and robotics are two areas that have grown exponentially in the last decade. Cloud computing is delivery of computing services over a cloud. Cloud computing allows a company to easily scale their operation by utilizing the elastic computing resources available over the cloud. Robotics deals with the design, construction, operation, and use of robots, as well as the collaboration of the robot with computer system for control, feedback, and information processing related to robots.

Both, these technologies provide different advantages. Currently, cloud robotics is an emerging field that attempts to use cloud technologies for the field of robotics. A cloud robotics solution provider would require both cloud services and robotics (device) services for generating cloud robotics application for an end user and a platform that allows the solution provider to deploy the application to the cloud and/or the robot/device. Therefore there is a need to provide a collaborative environment that allows the cloud robotics solution provider to easily generate a complex robotics application using re-usable cloud or device services provided by cloud and device developers, as well as deploy and provision the cloud device application at the cloud and/or devices.

DETAILED DESCRIPTION

Embodiments of techniques to generate cloud device application using software service store are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Connecting robots or devices to the cloud allows offloading heavy computation and storage of the robots or devices to the cloud. This is helpful in reducing the weight and enhancing computation performance of the device and/or robot. Despite the various advantages of cloud connected robots connecting devices or robots via the cloud is extremely complex, as discussed above.

A cloud device system is proposed that provides an on-demand access to a shared pool of software (platforms, applications, and services) that can be rapidly provisioned and released with minimal management effort or the cloud robotics solution provider interaction. The cloud device system also allows cloud and robotics developers to easily add reusable software services to the shared pool of software services store.

A cloud-device application is an application that executes at the cloud and/or one or more devices to perform a particular action. For example, a cloud device application may be an orthomap generation application that executes on the cloud and an unmanned aerial vehicle (UAV) (device). At the UAV, the orthomap application executes to capture images and videos using the UAV camera. The application then sends the captured images and videos to a cloud. The orthomap application then executes at the cloud to generate an orthomap based on the captured images.

A device is an object or a physical entity having a unique identifier and an ability to transfer data. In one embodiment, the device is a 'thing' in the Internet of Things (IoT). A thing, in the IoT context, refers to an entity or physical object that has a unique identifier, an embedded system, and the ability to transfer data over a network. These devices may include physical devices, home appliances, vehicles, edge devices, fog devices, etc. The device also includes robots that can perform actuation and sensing along with other device functionalities. A cloud is a collection of configurable system resources and services that can be rapidly provisioned with minimal management effort over a network, for example, Internet. The cloud provides several resources including computing power, storage, and other IT resources.

Figure 1:
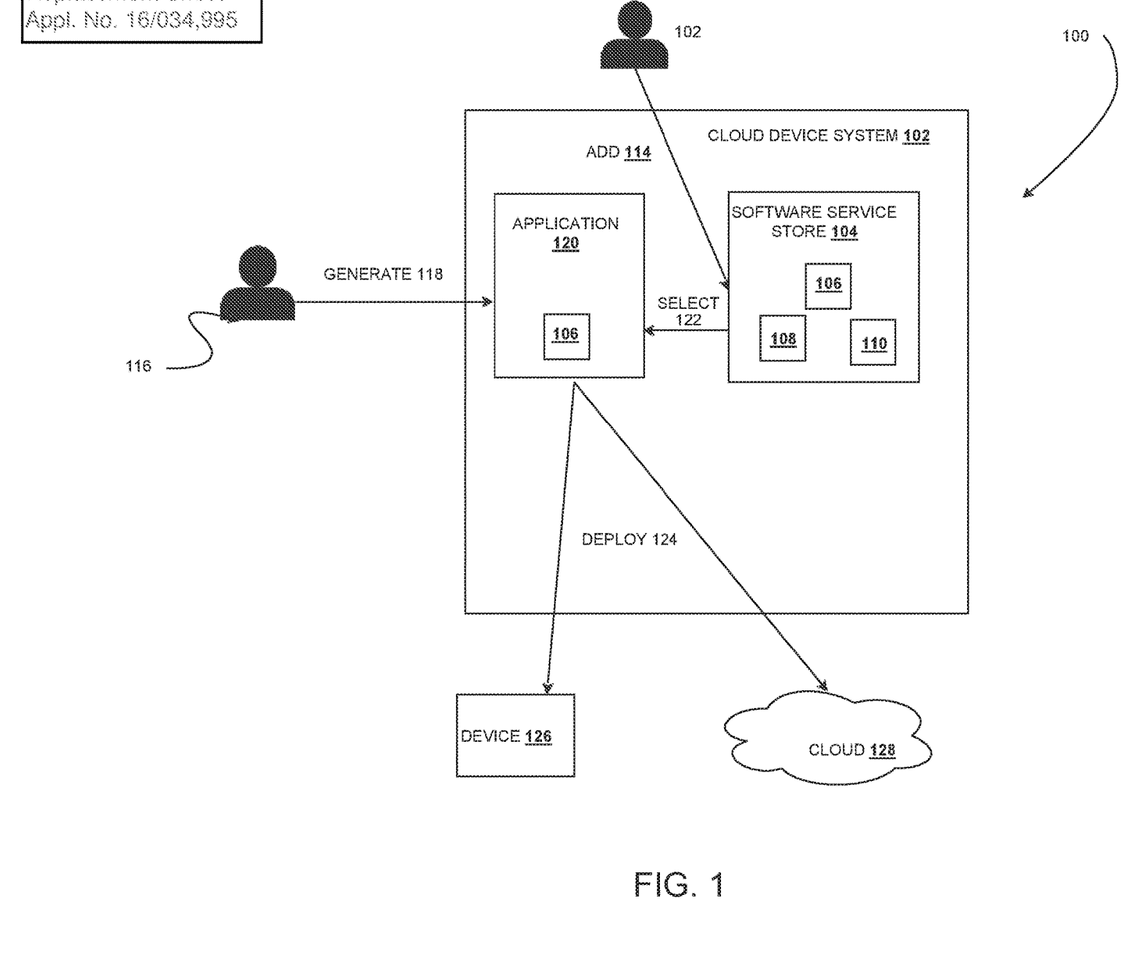
FIG. 1 is an exemplary block diagram illustrating a process to generate and provision a cloud device application, according to an embodiment.

FIG. 1 is a exemplary block diagram illustrating a process 100 to generate and provision a cloud device application, according to an embodiment. To generate the cloud device application, the cloud device system 102 provides a software service store 104 that is a categorized, tagged, and user rated collection of software services, for example, software services 106-110. A software service is a reusable service that provides one or more cloud and/or device related functionalities. For example, the software services 106-110 may include navigation service (device specific service), mapping service (device specific service), datastore service (cloud specific service), messaging service (cloud specific service), caching service (cloud specific service), etc. In one embodiment, the software service is a web service that exposes public or private endpoints (i.e., name, protocol, and port) using web protocols. A software service may have one or more of the following properties:

a. Code reuse: Software that is reusable;
b. Usage policy for using the service; and
c. Address for discovering the service.

In one embodiment, the software services 106-110 at the software service store 104 are reusable, i.e., the software services may be used by different cloud device applications and can be deployed and provisioned on any device or a cloud provided by the cloud device system or a third-party cloud solution provider. The cloud device system 102 allows a user 112 to add 114 software services 106-110 to the software service store 104. The user 114 may be a cloud or device software developer that can write reusable software services. When adding 114 the software services 106-110 to software service store 104 the user 112 may also define a set of exposed parameters and exposed network endpoints for the software services 106-110. Exposed parameters are parameters that the software services 106-110 exposes to another software service or an application to allow these application or services to use the application service. For example, username, password, and database store may be exposed parameters defined for a database software service. Whenever an application or service selects the database software service then the username, password, and database store variables of a cloud database, where the database software service is deployed, are retrieved and provided to the application or service.

The exposed network endpoints for a software service are web service endpoints for accessing a software service to retrieve exposed parameters and data values corresponding to the exposed parameters when the software service is deployed. In one embodiment, the exposed network endpoint is protocol, port, and service name. The supported protocols may include, for example, Secure TCP (TLS/SNI), HTTP/Websocket, and HTTPS/Websocket-Secure and UDP.

In one embodiment, the cloud device system 102 also allows a cloud device solution provider 116 to generate 118 a cloud device application 120 by selecting 122 one or more of the reusable software services 106-110 added to the software service store 104 as dependent application services to the defined application. For example, as shown in FIG. 1, the software service 106 is selected and included in the application 120.

In one embodiment, the software services 106-110 at the software service store 104 are reusable, i.e., the software services may be used by different cloud device applications and can be deployed and provisioned on any device or a cloud provided by the cloud device system or a third-party cloud solution provider. The cloud device system 102 allows a user 112 to add 114 software services 106-110 to the software service store 104. The user 112 may be a cloud or device software developer that can write reusable software services. When adding 114 the software services 106-110 to software service store 104 the user 112 may also define a set of exposed parameters and exposed network endpoints for the software services 106-110. Exposed parameters are parameters that the software services 106-110 exposes to another software service or an application to allow these application or services to use the application service. For example, username, password, and database store may be exposed parameters defined for a database software service. Whenever an application or service selects the database software service then the username, password, and database store variables of a cloud database, where the database software service is deployed, are retrieved and provided to the application or service.

Binding is a process of retrieving data values of the exposed parameters and exposed network endpoints of the deployed instance of software service instance 106 and injecting the retrieved data values and the exposed parameters into the instance of the application 120. The binding operation allows the application to access and use data values related to the selected software services. The binding operation completes the provisioning of the cloud device application 120. Provisioning is the process of providing the parameters, for example credentials, license, permission, etc., to a deployed application that are required for executing the application.

For example, consider a robot_management application that selects a temperature sensor service to measure the room temperature. The temperature sensor service has an exposed network endpoint HOST_AND_PORT (the network endpoint also includes the port) and exposed parameter ROOM_TEMPERATURE. In this case, the cloud device system generates and deploys an instance of the temperature sensor service to a sensor (device). The ROOM_TEMPERATURE parameter and the measured room temperature is then retrieved from the sensor. A binding operation is performed by inserting the exposed network endpoint, the exposed parameter ROOM_TEMPERATURE and the corresponding value of the temperature sensor service instance to the instance of robot_management application. Based on the binding operation, the ROOM_TEMPERATURE parameter and the measure room temperature value can be accessed by the robot_management application instance using the exposed network endpoint HOST_AND_PORT. Finally the robot_management application bound to the temperature sensor service may be deployed at the cloud. In this case, the robot_management application can access and share the room temperature value determined by the dependent temperature service required for determining whether the robot can work outdoors at the determined temperature.

The cloud device system 102 also allows the cloud device solution provider 116 to deploy 124 the cloud device application 120 to a device 126 and/or cloud 128. For the purpose of simplicity only one device is shown in FIG. 1, however the cloud device application 120 can be deployed on any number of devices. Before deploying the cloud device application 120, an instance of the software service 106 is deployed to the device 126 and/or cloud 128. The exposed parameters, parameter values, and the exposed service point of the deployed instance of the software service 106 is then bound to an instance of the application 120. The application 120 bound to the deployed instance of the software service 106 is finally deployed to the cloud 128 and/or the device 126.

The current disclosure therefore provides a technical solution in the field of cloud robotics and cloud device systems by allowing a cloud device solution provider to easily build cloud device application by using existing re-usable software services. The device service store also allows controlling the deployment and provisioning of the cloud device application and manage instantiation life cycles of different software services.

Figure 2:
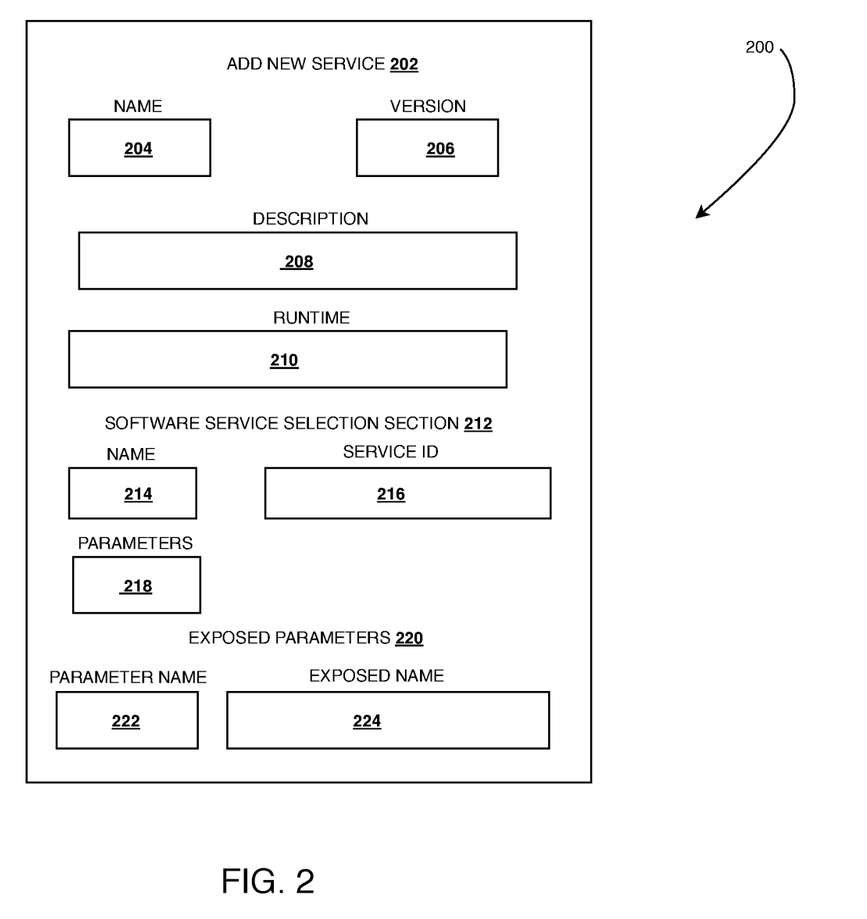
FIG. 2 is an exemplary screenshot of a cloud device system user interface (UI) to define an application or software service, according to an embodiment.

FIG. 2 is an exemplary screenshot of a cloud device system user interface (UI) 200 to define an application or software service, according to an embodiment. In one embodiment, developer selects an "add new service" tab (not shown) that opens an "add new service" form 202 for adding a new application or a software service to the software service catalog. A user provides name 204, version 206, and description 208 of the application and/or software service at the form 202. The user also defines the runtime 210 of the application or software service. The runtime of the application or software service defines whether the application or software service is to be executed at the cloud and/or the device. In case the runtime parameter is not selected then the software service can be deployed at both the cloud or the device depending on the runtime (cloud or device) selected at the time of deployment.

The form 202 also includes a software service selection section 212 to select a software service from the software service store to be included to the application. A name 214 and a service id 216 of the service is provided to identify the software service that is to be selected for the application. The form 202 also allows a user to identify parameters 218 of the selected software service. The form also allows identifying exposed parameters 220 of the software service by the parameter name 222 and the name 224 by which the parameter is exposed (exposed name).

In one embodiment, the form 202 also allows a user to select a composition pattern (not shown) for composing an application with the selected software service. Composing an application is a process to select a pattern in which the application and application service work together to perform one or more useful actions. Selecting the composition pattern includes selects an instantiation lifecycle for a software service. The different instantiation life cycle may depend on whether the user wants to create a new instance or use an existing instance of the software service for each deployment of the application.

In one embodiment, a user may select a one-to-one composition pattern when a user wants a one-to-one relationship between an application and the selected software services. One-to-one composition pattern may be selected when application and the application service should have the same instantiation lifecycle. In one-to-one composition pattern, whenever a deployment request is received for deploying an application then a new instance of the corresponding selected software service and the application are generated and deployed.

For example, consider a case of a robot_motion software application that manages motion of a robot. This robot_motion software application requires an obstacle_detection software service to detect obstacles during the robot's motion. In this case, the user may select an obstacle_detection software service as a dependency for the robot_motion application. The user may also select a one-to-one composition pattern for the composition of robot_motion application that has includes an obstacle_detection software service. Based on the selected one-to-one composition pattern, a instance of obstacle_detection software service is generated and deployed and an instance of robot_motion application is generated whenever a deployment request is received for deploying the robot_motion package. A binding operation is then performed to bind the generated instance of obstacle_detection software service with the instance of robot_motion application for detecting obstacles during robot's motion.

In one embodiment, a software service may have one or more software services as dependencies that may also have dependencies of its own. In this case, when a one-to-one composition pattern is selected for an application and this software service then initially the dependent software service(s) are instantiated and deployed at a cloud and/or device. The deployed instance of the dependent software service(s) are then bound to an instance of the software service. The instance of the software service including the bound dependent software service(s) is then deployed to cloud and/or device. An instance of the application may then be bound to the deployed instance of the software service. Finally, this application instance including the bound instances of the software service and the dependent software service(s) is deployed to a cloud or a device.

Similarly, the user may select a one-to-many composition pattern when a user wants to use an existing instance of a software service for different deployments of application. This composition pattern is selected when the developer needs to compose the desired service behavior by coupling application and service that follow different instantiation life-cycles and bind the application and service at package instantiation. For example, when multiple short lived agents are to be coupled with a long-running/stateful shared service (many-to-one).

For example, consider a map software service that provides a map for navigation a particular area. An Unmanned Aerial Vehicle (UAV) navigation application defined to fly a UAV over a particular area requires the map software service for navigating over a particular area. In this case, the user may select a map software service for the UAV navigation application. A user selects a one-to-many composition pattern for the composition of UAV navigation application that has the map software service as a dependency. When a deployment request is received for deploying the UAV navigation application then only an instance of the UAV navigation application is generated and deployed. The map software service in this case is a long-running service and based on the selected one-to-many composition pattern, an existing deployed instance of map software service binds to each new instance of UAV navigation application for allowing different UAVs to use the same map service.

In one embodiment, the cloud device system also allows a user to define a singleton composition pattern when the application has to be instantiated only for the first deployment request and the same instance of the application is used for any subsequent deployment request. A singleton pattern is a software design pattern that restricts the instantiation of a class to one object.

Finally the developer "Submit" 224 the application or software service to add the application or software service to the software service store. In one embodiment, after the application or software service is added to the software service store it can be deployed and provisioned at the cloud and/or devices. The application or services added to the software service store may then be classified automatically to one of the service classifications defined in the software service store. For example, an added service may be classified as one of the service classes: robotics services, device services, maintenance services, and cloud based services. The classification of a service allows a cloud device solution provider to easily select a service for generating the application.

Figure 3:
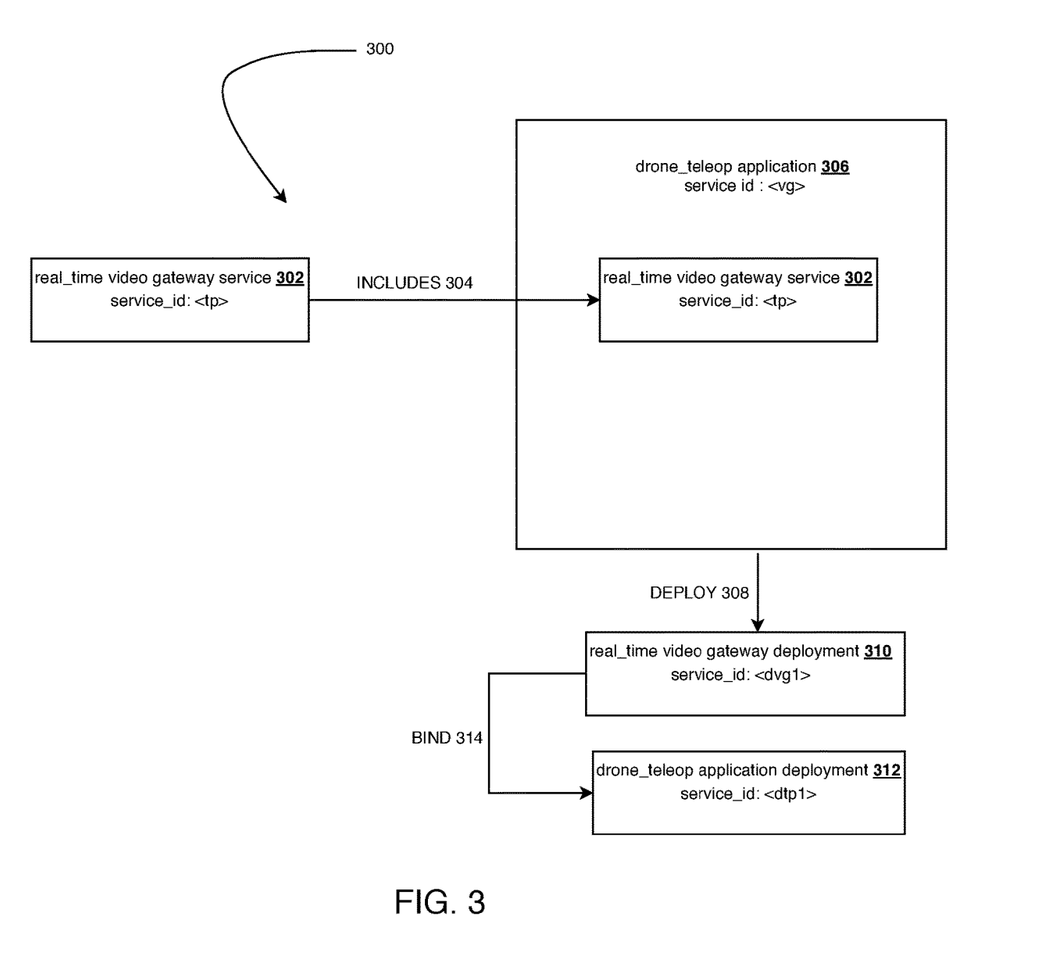
FIG. 3 is an exemplary block diagram illustrating instantiation and deployment of application when a one-to-one composition pattern is selected, according to an embodiment.

FIG. 3 is an exemplary block diagram 300 illustrating instantiation and deployment of application when a one-to-one composition pattern is selected, according to an embodiment. A developer when adding a robot_teleop application to the software service store may select a "real-time video gateway" software service with a one-to-one composition pattern.

The "real-time video gateway" service is a service that abstracts the video streaming logic and the underlying complex infrastructure into a simple_video_gateway that may be reused by different kinds of robot applications—for example an Automated Guided Vehicle (AGV) application or a UAV application.

As shown in FIG. 3, the "real_time video gateway" service 302, with a service_id <tp>, is included 304 as a service to a "drone_teleop" application 306, with service id<vg>. The "drone_teleop" application 306 may include any number of services, however for sake of simplicity only one service is shown in FIG. 3. A one-to-one composition pattern is selected for composing the "drone_teleop" application 306 including the "real_time video gateway" service 306. Next when a deployment request 308 is received for deploying the "drone_teleop" application 306 then an instance of the "real_time video gateway" service 302 and the "drone_teleop" application 306 is generated. The instance of the "real_time video gateway" service 302 is then deployed to a cloud and/or device. The deployed instance of the "real_time video gateway" service 302 is then bound to the instance of the "drone_teleop" application 306. Finally the instance of the "drone_teleop" application 306 bound to the deployed instance of "real_time video gateway" service 302 is deployed to a cloud and/or device.

As shown in FIG. 3, the real_time video gateway deployment 310 is a deployment of the real_time video gateway service 306. The drone_teleop service 312 deployment_id: <dtp1> is a deployed instance of "drone_teleop" service 306 that is deployed after binding 314 an instance of the real_time video gateway service 306 with the real_time video gateway deployment 310. Based on the binding operation 314 the retrieved data value of the exposed parameters and exposed network endpoints of the real_time video gateway deployment 310 are injected to the drone_teleop service deployment 312 that allows it to access the real_time videos using the exposed network endpoint.

Figure 4:
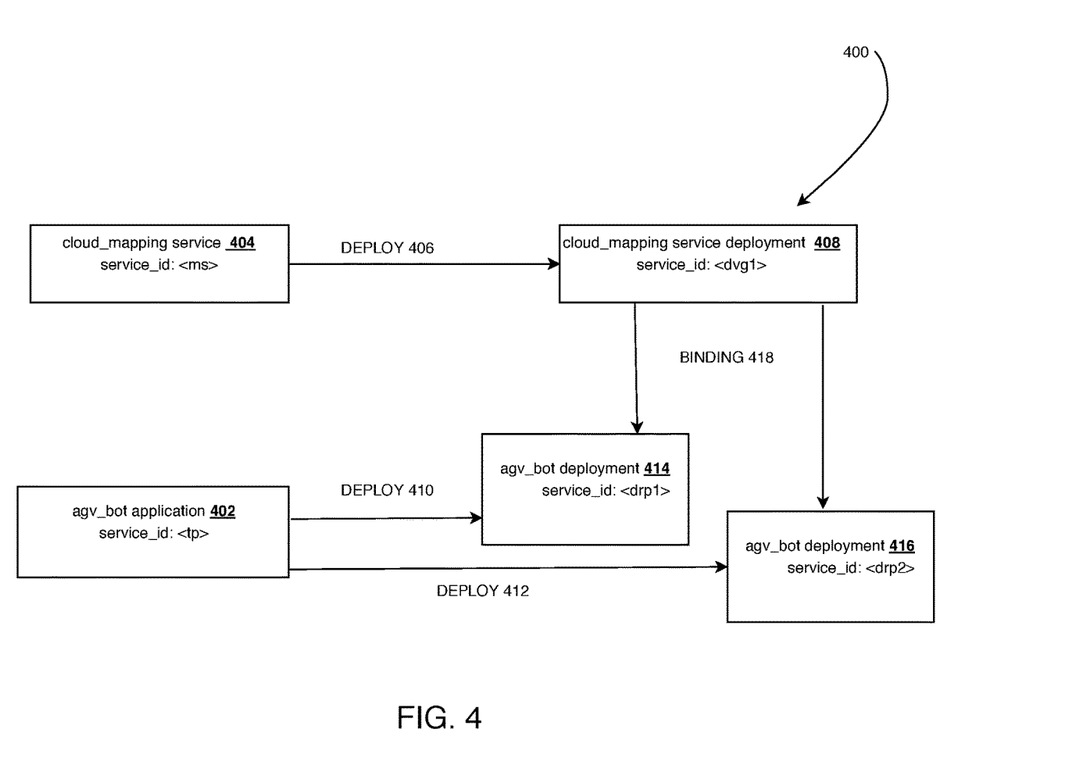
FIG. 4 is an exemplary block diagram illustrating instantiation and deployment of application when a one-to-many composition pattern is selected, according to an embodiment.

FIG. 4 is an exemplary block diagram 400 illustrating instantiation and deployment of application when a one-to-many composition pattern is selected, according to an embodiment. A developer when adding an agv_bot application 402, which is a robot_bot application, having service_id: <rp> to the software service store may select cloud_mapping service (service_id: <ms>) 404 with a one-to-many composition pattern.

As shown in FIG. 3, the "real_time video gateway" service 302, with a service_id<tp>, is included 304 as a service to a "drone_teleop" application 306, with service id<vg>. The "drone_teleop" application 306 may include any number of services, however for sake of simplicity only one service is shown in FIG. 3. A one-to-one composition pattern is selected for composing the "drone_teleop" application 306 including the "real_time video gateway" service 302. Next when a deployment request 308 is received for deploying the "drone_teleop" application 306 then an instance of the "real_time video gateway" service 302 and the "drone_teleop" application 306 is generated. The instance of the "real_time video gateway" service 302 is then deployed to a cloud and/or device. The deployed instance of the "real_time video gateway" service 302 is then bound to the instance of the "drone_teleop" application 306. Finally the instance of the "drone_teleop" application 306 bound to the deployed instance of "real_time video gateway" service 302 is deployed to a cloud and/or device.

As shown in FIG. 3, the real_time video gateway deployment 310 is a deployment of the real_time video gateway service 302. The drone_teleop service 312 deployment_id: <dtp1>is a deployed instance of "drone_teleop" service 306 that is deployed after binding 314 an instance of the real_time video gateway service 302 with the real_time video gateway deployment 310. Based on the binding operation 314 the retrieved data value of the exposed parameters and exposed network endpoints of the real_time video gateway deployment 310 are injected to the drone_teleop service deployment 312 that allows it to access the real_time videos using the exposed network endpoint.

A binding operation 418 provides the exposed parameters, values, and network endpoint of the deployed instance of the cloud_mapping service 408 to the different instances 414 and 416 of the agv_bot application 402. The different deployed instances 414 and 416 of the agv_bot application 402 can use the exposed parameters and corresponding value of the deployed instance of cloud_mapping service 408 to obtain the warehouse map for navigating the warehouse.

Figure 5:
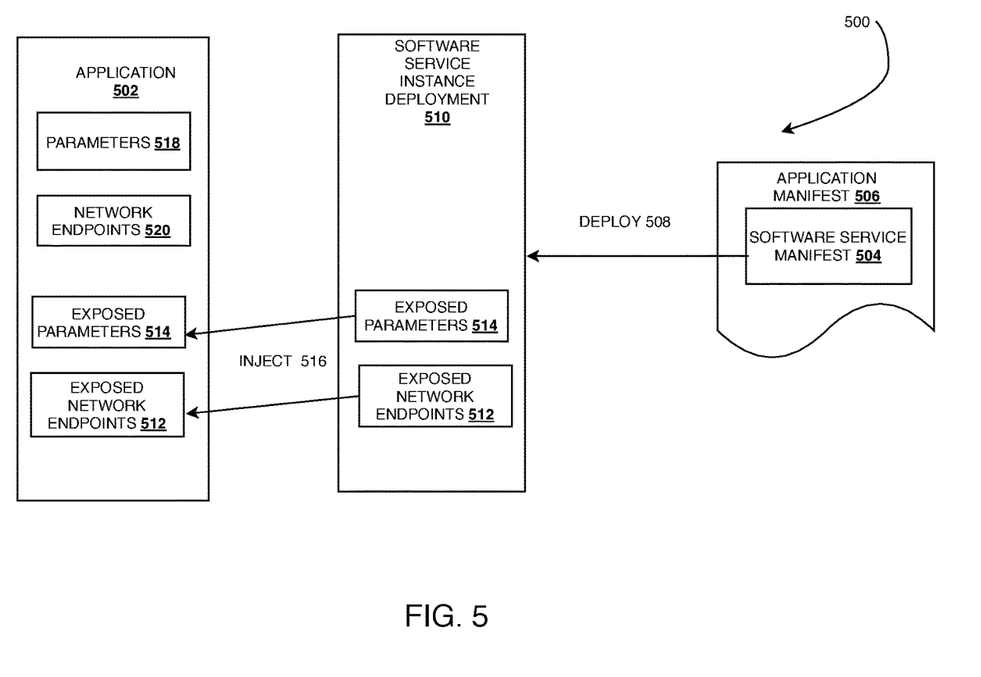
FIG. 5 is an exemplary process flow diagram illustrating a process to bind a software service to an application, according to an embodiment.

FIG. 5 is an exemplary process flow diagram illustrating a process 500 to bind a software service to an application, according to an embodiment. Initially, when an application 502 selects a software service from the software service store to be included in the application then a software service manifest 504 that includes service metadata of the selected service is stored in an application manifest file 506. The service manifest 504 includes information for building, deploying, and provisioning the software service in the cloud and/or device. The software service metadata also includes the composition relationship between the software service and the application.

The cloud device system then performs a build operation by retrieving the source code of the software service from a database store and building a containerized software service that includes the source code and the dependencies of the software service, including file system, system utilities, etc. The cloud device system then deploys 508 an instance of the containerized software service to a cloud and/or device, shown as software service instance deployment 510, based on the deployment information stored in the software service manifest 504. The deployment information includes the address of the cloud and/or device where the software service is to be deployed. Next the exposed network endpoints 512, parameters 514, and parameter values from the deployed instance of software service 510 deployed at the cloud and/or device is retrieved and stored at a relational database. The exposed parameter 514, parameter values and the endpoints 512 of the deployed instance of software service 510 are then injected 516 as environment variable of the application 502, to bind the application 502 to the deployed instance of the software service 510 allowing the application to use the software services. Post binding the application 502 with its parameters 518 and network endpoints 520, and injected exposed network endpoints 512 and exposed parameters 514 is able to perform complex cloud robotics function.

Figure 6:
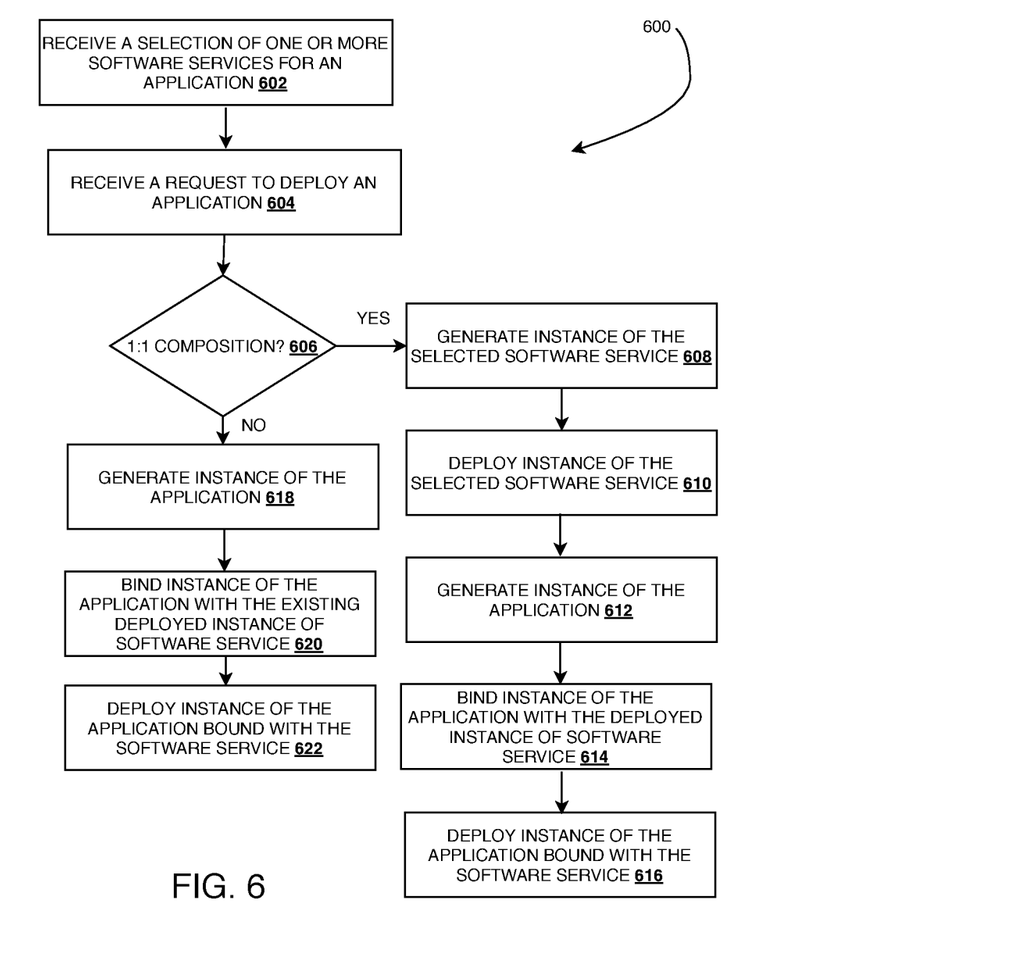
FIG. 6 is a block diagram illustrating a process to generate and deploy an application, according to an embodiment.

FIG. 6 is a block diagram illustrating a process 600 to generate and deploy an application, according to an embodiment. Initially a request 602 is received to select one or more services, added to the software service store, for an application. In one embodiment, information related to the application including the selected one or more services is included in an application manifest file.

Next a deployment request is received to deploy the application to the cloud and/or device (604). For deploying the application, a check is performed to determine whether the software service has a one-to-one relationship or a one-to-many relationship with the application. In case the software service has a one-to-one relationship with the application (condition in 606 is "Yes") then an instance of the software service included in the application is generated (608). The software service instance is then deployed to the cloud and/or device (610). Next an instance of the application is also generated (612). A binding operation is then performed between the deployed instance of the software service and the instance of the application (614). Next, the instance of the application including the bound software service is deployed at the cloud and/or device (616).

In case the software service has a one-to-many relationship with the application (condition in 606 is false) then an instance of the application is generated (618). A binding operation is then performed between the deployed instance of the software service and the generated instance of the application (620). Finally, the instance of the application including the bound software service is deployed at the cloud and/or service (622).

Figure 7:
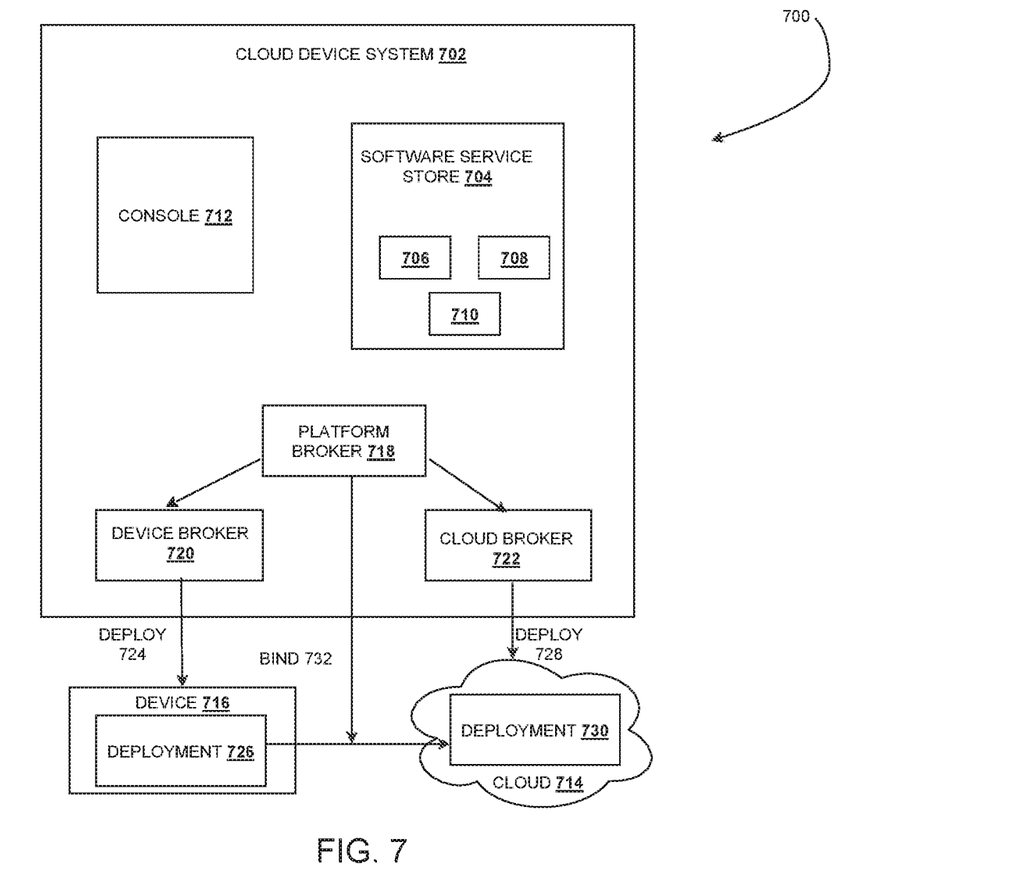
FIG. 7 is a block diagram illustrating a cloud device system to generate and deploy cloud device application, according to an embodiment.

FIG. 7 is a block diagram illustrating a cloud device system 700 to generate and deploy cloud device application, according to an embodiment. The cloud device system 702 includes a software service store 704 that may have several software services, for example, software services 706, 708, and 710. The cloud device system 700 includes a console 712 to select one or more of the software services 706-710 to be included in an application. The cloud device system 700 also includes service brokers to deploy the application and software services to the cloud 714 and/or device 716 and bind the application and software services.

As shown, the cloud device system 702 includes a platform broker 718 that generates instances of the application and software services and sends the generated instance of the application and software services to the device broker 720 and cloud broker 722, respectively. The device broker 720 and cloud broker 722 then checks whether the received instance of application and software service is to be deployed at the cloud and/or devices. The device broker 720 then deploys 724 the software service or application, represented by deployment 726, to one or more devices, for example device 716. Similarly, the cloud broker 722 deploys 728 an application or software service, represented by deployment 730, to the cloud 714. The platform broker 718 also binds 732 the software service and application deployed on device 716, cloud 714 or a combination of cloud 714 and device 716, or a binding between deployed applications.

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

The invention claimed is:

1. A computer implemented method to generate and deploy a cloud device application to one or more of cloud and one or more robots, the method comprising: receiving a selection of a software service, from a software service store, to generate the cloud device application; receiving a selection of composition pattern for generating the cloud device application including the software service, wherein composition pattern indicates whether a new instance or an existing instance of the software service is to be used for deployment; based on the selected composition pattern, generating an instance of the software service; deploying the instance of the software service at one or more of a cloud and one or more robots; generating an instance of the cloud device application; binding the instance of cloud device application with the instance of the deployed software service to provision the cloud device application; and deploying the instance of the cloud device application, bound to the deployed instance of the software service, to one or more of the cloud and one or more robots.

2. The computer implemented method according to claim 1, wherein binding the instance of the application with the deployed instance of software service comprises: retrieving data corresponding to one or more exposed parameters of the deployed instance of the software service; and injecting the exposed parameters, data, and exposed network endpoint of the deployed instance of the software service to the instance of the application.

3. The computer implemented method according to claim 1, wherein generating the instance of software service comprises: receiving deployment request for the application; determining whether selected composition pattern is a one-to-one composition pattern between the selected software service and the application; and generating the instance of the software service when the selected composition pattern is the one-to-one composition.

4. The computer implemented method according to claim 1, wherein binding the instance of cloud device application with the instance of the deployed software service comprises: receiving deployment request for the software service; determining whether the selected composition pattern is a one-to-many composition pattern between the selected software service and the dependent software service; and binding the instance of cloud device application with an existing instance of the deployed software service to provision the cloud device application.

5. The computer implemented method according to claim 1, wherein binding the instance of cloud device application with the instance of the deployed software service comprises: receiving deployment request for the software service; determining whether a selected plan for a dependent software service is singleton; generating the instance of the application for a first deployment request; and binding the generated instance of cloud device application with the instance of the deployed software service.

6. The computer implemented method according to claim 1, further comprising: receiving a selection of application service for generating the cloud device application; based on the received selection generating the cloud device application; and adding the generated cloud device application to the software service store.

7. The computer implemented method according to claim 1, further comprising: classifying the software service in one or more classification categories defined at the software service store, wherein at least one of the classification categories is robotics services.

8. A cloud device system to generate and deploy a cloud device application, the system comprising:
a memory to store instructions; and a processor to execute the instructions to:
store a plurality of software services; select one or more software services for generating the cloud device application; receive a selection of composition pattern for generating the cloud device application, wherein composition pattern indicates whether a new instance or an existing instance of the selected one or more software services is to be used for deployment; generate an instance of the application and the selected software service; deploy the instance of the software service to one or more of a cloud and one or more robots; deploy the generated instance of the application bound to the deployed instance of the software service to one or more of the cloud and one or more robots.

9. A computer system to generate a cloud device application to one or more of cloud and one or more robots, the system comprising: a memory to store instructions; and a processor to execute the instructions to: receive a selection of a software service, from a software service store, to generate the cloud device application; receive a selection of composition pattern for generating the cloud device application including the software service, wherein composition pattern indicates whether a new instance or an existing instance of the software service is to be used for deployment; based on the selected composition pattern, generate an instance of the software service; deploy the instance of the software service to one or more of cloud and one or more devices; generating an instance of the cloud device application; bind the instance of cloud device application with the instance of the deployed software service; and deploy the instance of the cloud device application bound to the deployed instance of the software service to one or more of the cloud and one or more devices.

10. The computer system according to claim 9, wherein the processor further executes the instructions to: retrieve data corresponding to one or more exposed parameters of the deployed instance of the software service; and inject the exposed parameters, data, and exposed network endpoint of the deployed instance of the software service to the instance of the application.

11. The computer system according to claim 9, wherein the processor further executes the instructions to: receive deployment request for the application; determine whether selected composition pattern is a one-to-one composition pattern between the selected software service and the application; and generate the instance of the software service when the selected composition pattern is the one-to-one composition.

12. The computer system according to claim 9, wherein the processor further executes the instructions to: receive deployment request for the software service; determine whether the selected composition pattern is a one-to-many composition pattern between the selected software service and the dependent software service; and bind the instance of cloud device application with an existing instance of the deployed software service to provision the cloud device application.

13. The computer system according to claim 9, wherein the processor further executes the instructions to: receive deployment request for the software service; determine whether a selected plan for a dependent software service is singleton; generate the instance of the application for a first deployment request; and bind the generated instance of cloud device application with the instance of the deployed software service.

14. The computer system according to claim 9, wherein the processor further executes the instructions to: receive a selection of application service for generating the cloud device application; based on the received selection generating the cloud device application; and add the generated cloud device application to the software service store.

15. The computer system according to claim 9, wherein the processor further executes the instructions to: classify the software service in one or more classification categories defined at the software service store, wherein at least one of the classification categories is robotics services.

16. A non-transitory computer readable medium encoded with instructions that when executed by a computer causes the computer to: receive a selection of a software service, from a software service store, to generate the cloud device application; receive a selection of composition pattern for generating the cloud device application including the software service, wherein composition pattern indicates whether a new instance or an existing instance of the software service is to be used for deployment; based on the selected composition pattern, generate an instance of the software service; deploy the instance of the software service to one or more of a cloud and one or more devices; generating an instance of the cloud device application; bind the instance of cloud device application with the instance of the deployed software service; and deploy the instance of the cloud device application to one or more of the cloud and one or more devices.

17. The non-transitory computer readable medium according to claim 16 further including instructions which when executed by a computer causes the computer to: retrieve data corresponding to one or more exposed parameters of the deployed instance of the software service; and inject the exposed parameters, data, and exposed network endpoint of the deployed instance of the software service to the instance of the application.

18. The non-transitory computer readable medium according to claim 16 further including instructions which when executed by a computer causes the computer to: receive deployment request for the application; determine whether selected composition pattern is a one-to-one composition pattern between the selected software service and the application; and generate the instance of the software service when the selected composition pattern is the one-to-one composition.

19. The non-transitory computer readable medium according to claim 16 further including instructions which when executed by a computer causes the computer to: receive deployment request for the software service; determine whether the selected composition pattern is a one-to-many composition pattern between the selected software service and the dependent software service; and bind the instance of cloud device application with an existing instance of the deployed software service to provision the cloud device application.

20. The non-transitory computer readable medium according to claim 16 further including instructions which when executed by a computer causes the computer to: receive deployment request for the software service; determine whether a selected plan for a dependent software service is singleton; generate the instance of the application for a first deployment request; and bind the generated instance of cloud device application with the instance of the deployed software service.

\* \* \* \* \*